(12) United States Patent
Korcharz et al.

(10) Patent No.: US 7,567,579 B2
(45) Date of Patent: Jul. 28, 2009

(54) MULTIPLE CURRENT LIMITS FOR POWER OVER ETHERNET CONTROLLER

(75) Inventors: Dror Korcharz, Bat Yam (IL); Shimon Cohen, Burgata (IL); Alon Ferentz, Bat Yam (IL); Nadav Barnea, Or Yehuda (IL); Eli Ohana, Kfar Sava (IL)

(73) Assignee: Microsemi Corp.-Analog Mixed Signal Group Ltd., Hod Hasharon (IL)

( * ) Notice: Subject to any disclaimer, the term of this patent is extended or adjusted under 35 U.S.C. 154(b) by 446 days.

(21) Appl. No.: 11/552,995

(22) Filed: Oct. 26, 2006

(65) Prior Publication Data

US 2007/0121929 A1    May 31, 2007

Related U.S. Application Data

(63) Continuation-in-part of application No. 10/218,739, filed on Aug. 13, 2002, now Pat. No. 7,327,743, which is a continuation of application No. 09/365,584, filed on Aug. 2, 1999, now Pat. No. 6,473,608.

(51) Int. Cl.
*H04L 12/413* (2006.01)
*G06F 1/32* (2006.01)

(52) U.S. Cl. .................. 370/401; 370/445; 370/463; 713/340

(58) Field of Classification Search .............. None
See application file for complete search history.

(56) References Cited

U.S. PATENT DOCUMENTS

| | | | |
|---|---|---|---|
| 5,675,813 A * | 10/1997 | Holmdahl | 713/310 |
| 5,991,885 A | 11/1999 | Chang et al. | |
| 6,076,119 A * | 6/2000 | Maemura et al. | 710/15 |
| 6,101,076 A * | 8/2000 | Tsai et al. | 361/90 |
| 6,178,514 B1 * | 1/2001 | Wood | 713/300 |
| 6,218,930 B1 | 4/2001 | Katzenberg et al. | |
| 6,348,874 B1 | 2/2002 | Cole et al. | |
| 6,473,608 B1 * | 10/2002 | Lehr et al. | 455/402 |
| 6,643,566 B1 * | 11/2003 | Lehr et al. | 700/286 |
| 7,257,724 B2 * | 8/2007 | Lehr et al. | 713/323 |
| 7,327,743 B2 * | 2/2008 | Lehr et al. | 370/401 |

OTHER PUBLICATIONS

Universal Serial Bus Specification—Rev 1.0, Jan. 15, 1996, Compaq Computer Corporation et al, pp. 29-30; 131-135; 170-171; and 184-185.

* cited by examiner

*Primary Examiner*—Chi H. Pham
*Assistant Examiner*—Soon D. Hyun
(74) *Attorney, Agent, or Firm*—Simon Kahn (57) ABSTRACT

A power over Ethernet controller comprising: a control circuitry; at least one powering port, each of the at least one powering port comprising a unique means for controlling a switch associated therewith; and at least one current limiter, each of the at least one current limiter being associated with a unique one of the at least one powering port, each of the at least one current limiter being operable to limit the current through the controlled switch to a particular one of a plurality of values, each of the values being in excess of 100 mA, the particular value being selected responsive to the control circuitry.

24 Claims, 4 Drawing Sheets

MULTIPLE CURRENT LIMITS FOR POWER OVER ETHERNET CONTROLLER

CROSS-REFERENCE TO RELATED APPLICATIONS

This application is a continuation-in-part of U.S. patent application Ser. No. 10/218,739 filed Aug. 13, 2002 which is a continuation of U.S. patent application Ser. No. 09/365,584 filed Aug. 2, 1999 issued as U.S. Pat. No. 6,473,608, the contents of all of which are incorporated herein by reference.

BACKGROUND OF THE INVENTION

The present invention relates to the field of power over Ethernet and more particularly to a power over Ethernet controller exhibiting a plurality of pre-defined current limits each available for each port of the power over Ethernet controller.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

Several patents addressed to this issue exist including: U.S. Pat. No. 6,473,608 issued to Lehr et al., whose contents are incorporated herein by reference and U.S. Pat. No. 6,643,566 issued to Lehr et al., whose contents are incorporated herein by reference. Furthermore a standard addressed to the issue of powering remote devices over an Ethernet based network has been published as IEEE 802.3af-2003, whose contents are incorporated herein by reference, and is referred to hereinafter as the "af" standard. A device receiving power over the network wiring is referred to as a powered device (PD) and the powering equipment delivering power into the network wiring for use by the PD is referred to as a power sourcing equipment (PSE).

Commercially available PSEs are supplied supporting a single port, or supporting a plurality of ports. For clarity, each port of a power over Ethernet (PoE) controller serving a plurality of ports is referred to as a PSE and exhibits electrical characteristics as described in the "af" standard. In particular a current limit, denoted hereinafter as $I_{limit}$, is defined that is not to be exceeded, even in the event of a short circuit, and is preferably also used to limit inrush current of the PD, defined as $I_{inrush}$.

An additional overload limit lower than $I_{limit}$ is defined for each port and denoted hereinafter as $I_{cut}$. Current through the port may exceed $I_{cut}$, provided that $I_{limit}$ is not exceeded, for a specified amount of time, denoted hereinafter as $T_{ovld}$. In the event current through the port exceeds $I_{cut}$ for more than $T_{ovld}$ power through the port is disconnected. Current through the port is thus to be monitored and compared with $I_{cut}$, however $I_{cut}$ is not associated with a current limiter.

A PoE controller serving a plurality of ports preferably is provided with a power management functionality which prevents powering of ports in excess of the available overall power. In an exemplary embodiment this is accomplished by providing a guard band as described in copending U.S. patent application Ser. No. 10/949,208 filed Sept. 27, 2004 entitled "METHOD AND APPARATUS FOR POWER MANAGEMENT IN A LOCAL AREA NETWORK", the entire contents of which is incorporated herein by reference. In an exemplary embodiment the guard band is equal to, or greater than, the maximum power which may be drawn by a port, the maximum power typically being a function of the inrush current. Thus, by implementing the guard band, no port can be powered which would bring the total utilized power to be in excess of the total available power. It is to be understood that in the event the total utilized power is in excess of the total available power even during an inrush event, unless power to at least one port is disabled the power supply will overload and shut down.

The above mechanism is generally satisfactory, however in the event a small power supply is utilized, having a capacity on the order of 2-4 fully powered "af" ports, the guard band prevents utilization of a significant portion of the power supply capabilities. This is particularly problematic in the event that the attached PDs are capable of starting up with a limited inrush current, and draw power well below the maximum allowed by the "af" standard. It would be advantageous in such a circumstance to have a lower port current limit assigned, thereby limiting the inrush current to an amount less than the maximum allowed by the "af" standard. This in effect reduces the guard band and allows for powering of ports with an increased utilization of the power supply.

The "af" standard limits the amount of power available to a powered device to 12.95 watts, and devices demanding power in excess of the 12.95 watt power limit are not supported. In order to meet growing power demands, in particular demands for PDs drawing in excess of 12.95 watts, a study group entitled "IEEE 802.3at DTE Power Enhancements Task Force" has been formed, which is in the process of producing a higher power standard, hereinafter the "at" standard. While the study group has not yet finalized its recommendations, it appears that "at" standard will specify a higher current limit than the "af" standard, and the PSEs meeting the "at" standard are to support PDs meeting the "af" standard.

What is needed, and not supplied by the prior art, is a PoE controller supporting a plurality of current limits each of which may be associated with any of the ports of the PoE controller.

SUMMARY OF THE INVENTION

Accordingly, it is a principal object of the present invention to overcome the disadvantages of prior art. This is provided in the present invention by a PoE controller providing a plurality of selectable current limit values. Each port of the PoE controller may be assigned to any one of the plurality of current limit values and the assignment may be dynamically changed.

The invention provides for a power over Ethernet controller comprising: a control circuitry; at least one powering port, each of the at least one powering port comprising a unique means for controlling a switch associated therewith; and at least one current limiter, each of the at least one current limiter being associated with a unique one of the at least one powering port, each of the at least one current limiter being operable to limit the current through the controlled switch to a particular one of a plurality of values, each of the values being in excess of 100 mA, the particular value being selected responsive to the control circuitry.

In one embodiment the at least one powering port comprises a plurality of powering ports and the control circuitry is operable to limit the current through each of the current limiters associated with the plurality of powering ports to a single one of the plurality of values. In another embodiment the at least one powering port comprises a plurality of powering ports comprising a first group and a second group, and the control circuitry is operable to limit the current through the current limiters associated with the first group to a first value, and to limit the current the current limiters associated with the second group to a second value, the first value being different than the second value.

In one embodiment the particular value is responsive to classification of a powered device connected to the powering port. In another embodiment each of the unique means for controlling a switch is responsive to the control circuitry, and wherein the control circuitry is operative to: detect a powered device connected to a particular one of the at least one powering port; set the current limiter associated with the particular powering port to a first one of the plurality of values; operate the unique means for controlling a switch associated with the particular powering port to power the detected powered device; and responsive to information transmitted by the detected powered device, set the current limiter associated with the particular powering port to a second one of the plurality of values.

In one embodiment each of the unique means for controlling a switch represents a unique output of the control circuitry. In one further embodiment each of the at least one power port further comprises an electronically controlled switch responsive to the unique means for controlling a switch.

In one embodiment the control circuitry comprises a plurality of registers, each of the plurality of registers comprising a digital value associated with one of the plurality of values. In one further embodiment the power over Ethernet controller further comprises a digital to analog converter operable to convert a particular one of the values in the plurality of registers to an analog value, each of the current limiters limiting the current responsive to the analog value. In another further embodiment the power over Ethernet controller further comprises: a plurality of digital to analog converters, each of the plurality of digital to analog converters being associated with a particular one of the plurality of registers and operable to convert the digital value to an analog value; and a multiplexer responsive to the control circuitry, the multiplexer in communication with the output of each of the plurality of digital to analog converters and operable by the control circuitry to connect one of the analog values to one of the plurality of current limiters thereby limiting the current.

In one embodiment the control circuitry is operable to: obtain data indicative of the total available power; detect a first powered device connected to a first one of the at least one powering port; set the current limiter associated with the first powering port to a first one of the plurality of values; operate the unique means for controlling a switch associated with the first powering port to power the detected first powered device; determine an available power, the available power being responsive to the obtained data indicative of the total available power and one of the power being drawn by the powered device connected the first powering port and the power allocated to the powered device connected to the first powering port; detect a second powered device connected to a second one of the at least one powering port; set the current limiter of the second powering port to a value consonant with the determined available power; and operate the unique means for controlling a switch associated with the second powering port to power the detected second powered device. In one further embodiment the determined available power value thereby prevents overload of the total available power.

The invention also provides for a method of powering over communication cabling, the method comprising: providing a plurality of current limit values, each of the provided current limit values being in excess of 100 mA; providing at least one powering ports, each of the provided at least one powering port having associated therewith a current limiter limiting the current flowing through the powering port; and setting the associated current limiter of each of the provided at least one powering port to a particular one of the provided plurality of current limit values.

In one embodiment the provided at least one powering port comprises a plurality of powering ports, and the setting of the associated current limiter of each of the provided plurality of powering ports is to a single one of the plurality of values. In another embodiment the provided at least one powering port comprises a plurality of powering ports comprising a first group and a second group, and the setting of the current limiter associated with the first group is to a first value, and the setting of the current limiter associated with the second group is to a second value, the first value being different than the second value.

In one embodiment the method further comprises: detecting a powered device connected to a particular one of the provided at least one powering port; and classifying the detected powered device to determine a maximum current draw, wherein the setting of the current limiter associated with the particular one of the provided plurality of ports is responsive to the classifying. In another embodiment the setting of the associated current limiter is to a first one of the plurality of values, and the method further comprises: detecting a powered device connected to a particular one of the provided at least one powering port; powering the powered device; receiving information transmitted by the powered device, the information being associated with powering requirements of the powered device; and setting the associated current limiter of the provided particular powering port to a second one of the provided plurality of current limit values responsive to the received information.

In one embodiment the method further comprises storing each of the provided plurality of values is stored in a unique register. In one further embodiment the method further comprises converting the stored value to an analog value.

In one embodiment the setting of the associated at least one current limiter is to a first one of the plurality of values, and the method further comprises: obtaining data indicative of the total available power; detecting a first powered device connected to a first one of the provided at least one powering port; powering the detected first powered device; determining an available power, the available power being responsive to the obtained data indicative of the total available power and one of the power being drawn by the detected first powered device and the power allocated to the detected first powered device; detecting a second powered device connected to a second one of the provided at least one powering port; setting the current limiter associated with the second powering port to a limit consonant with the determined available power; and powering the detected second powered device. In a further embodiment the determined available value prevents overload of the total available power.

The invention also provides for a power over Ethernet controller supporting a plurality of powering ports, the power over Ethernet controller comprising: a control circuitry; a plurality of powering ports, each of the powering ports comprising a switch responsive to the control circuitry; and a plurality of current limiters, each of the plurality of current limiters being associated with a unique one of the powering ports, each of the plurality of current limiters being operable to limit the current through the switch to a particular one of a plurality of values, each of the values being in excess of 100 mA, the particular value being selected responsive to the control circuitry.

The invention also provides for a power over Ethernet controller comprising: a control circuitry; a powering port comprising a switch responsive to the control circuitry; and a current limiter arranged to limit the current through the controlled switch to a particular one of a plurality of values, each of the values being in excess of 100 mA, the particular value being selected responsive to the control circuitry.

The invention also provides for a power over Ethernet controller comprising: a control circuitry; a powering port comprising a means for controlling a switch associated therewith; and a current limiter operable to limit the current through the controlled switch to a value responsive to the control circuitry, the control circuitry being operable to detect a powered device connected to the at least one powering port, classify the power requirements of the detected powered device and set the current limiter to a particular value responsive to the classified power requirements.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

The present embodiments enable a PoE controller providing a plurality of selectable current limit values associated therewith. Each port of the PoE controller may be assigned to any one of the plurality of current limit values and the assignment may be dynamically changed.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
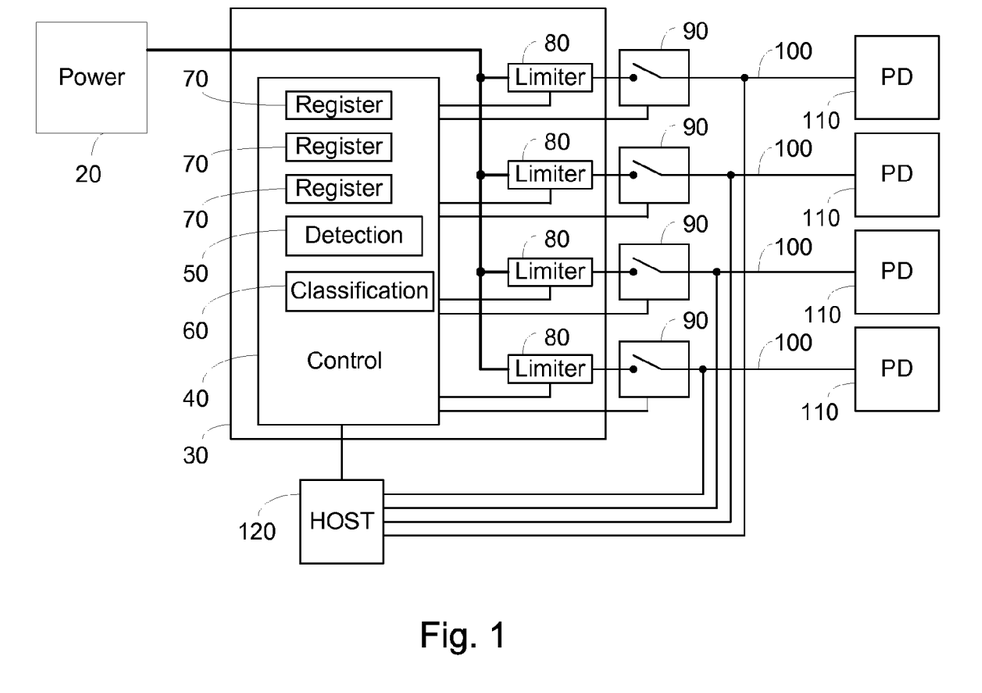
FIG. 1 is a high level schematic diagram of a PoE controller, power source and associated powered devices, the POE controller serving 4 ports each exhibiting a voltage-controlled switch and a current limiter and further exhibiting control circuitry comprising a plurality of current limit value registers in accordance with the principle of the invention.

FIG. 1 is a high level schematic diagram of a system comprising: a PoE controller 30; a power source 20; associated powered devices 110 connected to PoE controller 30 by a respective communication cabling 100; and a host 120. POE controller 30 serves 4 ports, each exhibiting an associated electronically controlled switch 90 and a current limiter 80. POE controller 30 further comprises a control circuitry 40 exhibiting a first, second and a third current limit value register 70, detection functionality 50 and classification functionality 60 in accordance with the principle of the invention.

Power source 20 is connected to POE controller 30 at one end of each current limiter 80. The second end of each current limiter 80 is connected to the input of the respective electronically controlled switch 90. The control input of each electronically controlled switch 90 is connected to a respective output of control circuitry 40. The output of each electronically controlled switch 90 is connected by a respective communication cabling 100 to powered device 110. The data path of each communication cabling 100 is connected to host 120 and the output of host 120 is connected to an input of control circuitry 40. The control input of each current limiter 80 is connected to a respected output of control circuitry 40.

In operation, control circuitry 40 utilizes detection functionality 50 to detect a valid powered device 110 connected via communication cabling 100 to a respective output port. Control circuitry 40 further utilizes classification functionality 60 to classify the identified powered device 110 as to power requirements. Control circuitry 40 sets current limiter 80 associated with the identified powered device 110 with the value found in one of first, second and third current limit value registers 70 so as to limit the amount of current flowing through current limiter 80. Control circuitry 40 further operates electronically controlled switch 90 so as to supply power to the identified and classified powered device 110 via the respective communication cabling 100. It is to be understood that classification is optional and in the absence of classification a default value is assumed. Host 120 is operable to receive optional requests from powered device 110 to adjust the current limit. Host 120 communicates with control circuitry 40, which is operable to load a current value from a different one of first, second and third current limit value register 70 to the associated current limiter 80 thereby adjusting the current limit and resultant power responsive to the optional power request from powered device 110.

Figure 2:
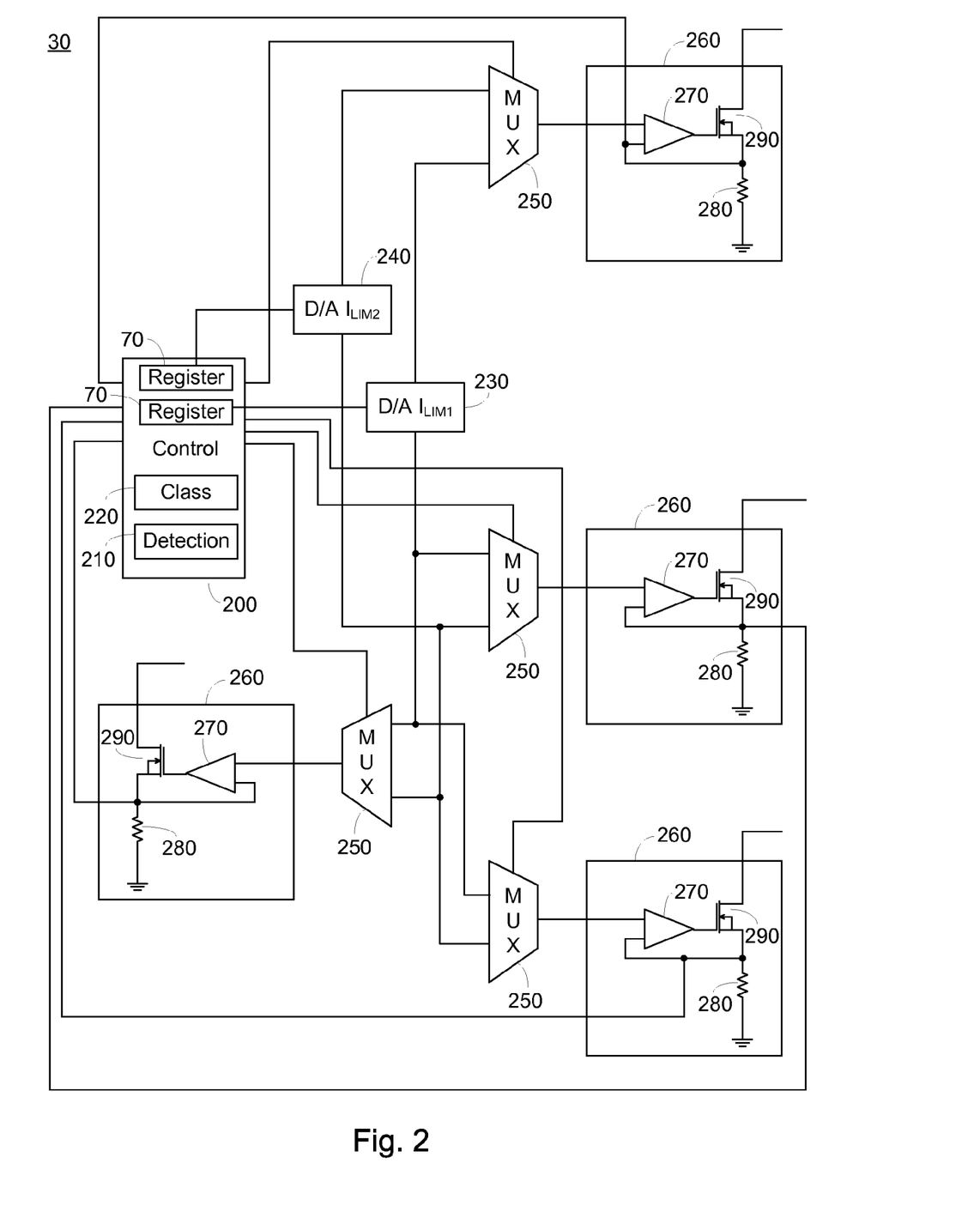
FIG. 2 is a high level schematic diagram of an embodiment of a POE controller exhibiting control circuitry, adjustable current limiters, multiplexers and analog-to-digital converters associated with current limit registers in accordance with the principle of the current invention.

FIG. 2 is a high level schematic diagram of an embodiment of a POE controller 30 exhibiting a control circuitry 200, a plurality of adjustable current limiters 260, multiplexers 250, a digital-to-analog converter 230 and a digital-to-analog converter 240 in accordance with a principle of the invention. Control circuitry 200 comprises a first and second current limit value register 70, a detection functionality 200 and a classification functionality 220. Each adjustable current limiter 260 comprises a comparator 270, a sense resistor 280 and an FET 290.

The input of digital-to-analog converter 230 is connected to an output of control circuitry 200 associated with first current limit value register 70 and the output of digital-to-analog converter 230 is connected to a first input of each multiplexer 250. The input of digital-to-analog converter 240 is connected to an output of control circuitry 200 associated with second current limit value register 70 and the output of digital-to-analog converter 240 is connected to a second input of each multiplexer 250. The control input of each multiplexer 250 is connected to a respective output of control circuitry 200. The output of each multiplexer 250 is connected to a first input of comparator 270 of the respective adjustable current limiter 260. The output of each comparator 270 is connected to the gate input of the associated FET 290. The source of FET 290 is connected to the second input of the respective comparator 270, to a first end of sense resistor 280 and to a respective input of control circuitry 200. The second end of sense resistor 280 is connected to a common ground. The drain of each FET 290 represents the output port connection.

In operation, control circuitry 200 operates detection functionality 210 to detect a powered device 110 as described in relation to FIG. 1. Control circuitry 200 operates classification functionality 220 to classify the power requirements of the detected powered device 1 10. Control circuitry 200 is further operative to operate the respective multiplexer 250 so as to connect the output of one of digital-to-analog 230 associated with first current limit value register 70 and digital-to-analog converter 240 associated with second current limit value register 70 to the first input of the respective comparator 270. Comparator 270 is operable to control the current flowing through FET 290 to be equal to the output of multiplexer 250. Thus, by the operation of the respective multiplexer 250 the output of digital-to-analog converter 230 presenting the value of first current limit value register 70 or the output of digital-to-analog converter 240 presenting the value of second current limit value register 70 is applied to current limiter 260. POE controller 30 is illustrated with a total of four ports, two current limit value registers 70 and associated digital-to-analog converters 230, 240, however this is not meant to be limiting in any way. Additional registers and associated digital-to-analog converters may be supplied without exceeding the scope of the invention. Similarly, a single digital-to-analog converter in cooperation with a sample and hold circuit associated with each port may be supplied without exceeding the scope of the invention. Additionally, more than four ports or fewer than four ports may be supplied without exceeding the scope of the invention.

Figure 3:
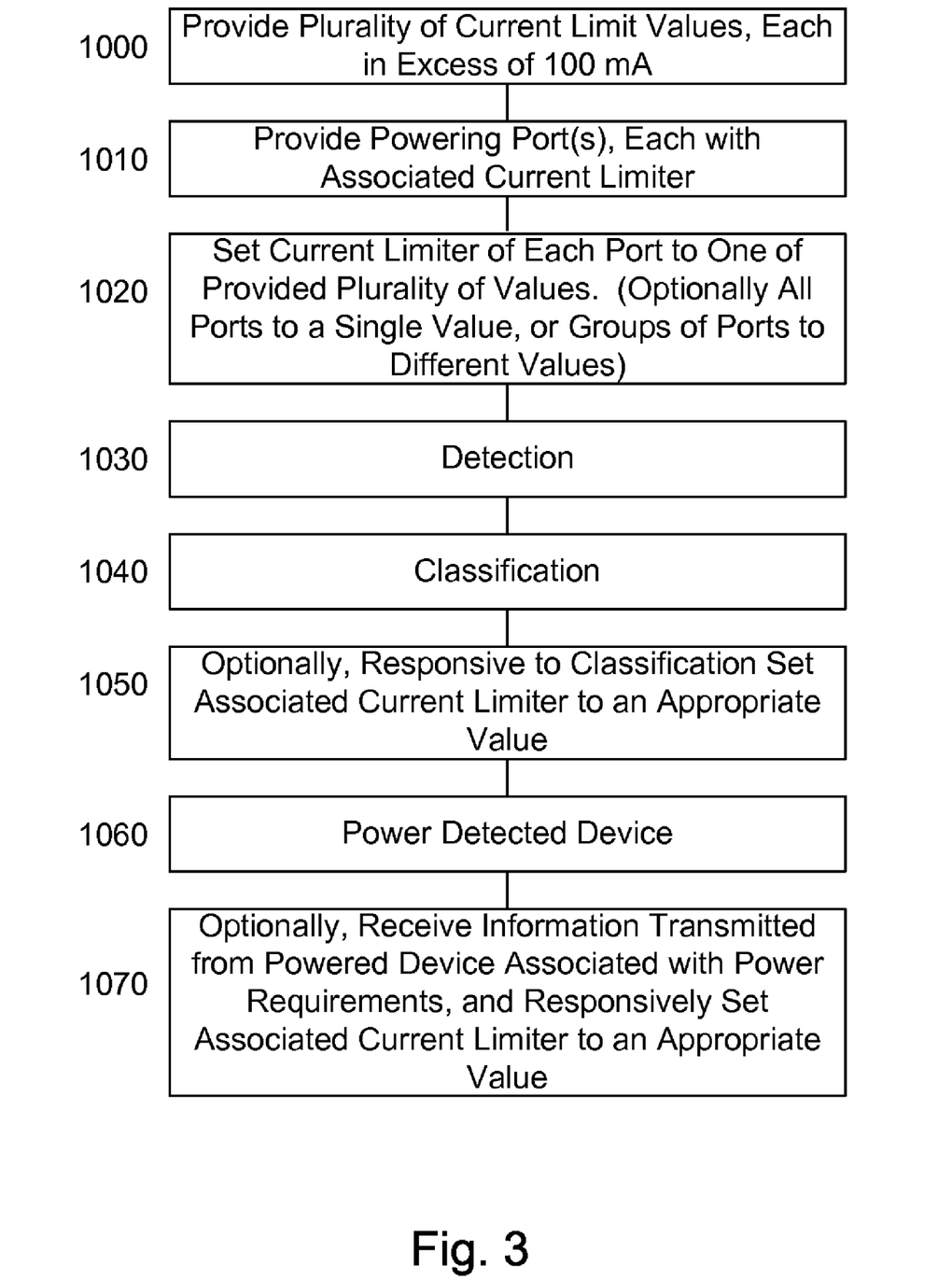
FIG. 3 illustrates a high level flow chart of an embodiment of the operation of the control circuitry of the PoE controller of FIGS. 1 or 2 to select and utilize the appropriate current limit for each port in accordance with the principle of the invention.

FIG. 3 illustrates a high level flow chart of an embodiment of the operation of control circuitry 40, 200 of PoE controller 30 of FIGS. 1 or 2 to select and utilize the appropriate current limit for each port in accordance with the principle of the invention. In stage 1000 a plurality of current limit values each of which exceed 100 mA is provided. Values below 100 mA are typically not supplied for high power operation and are typically associated with automatic fallback positions to prevent overheating or internal damage to PoE controllers with internal FETs. In stage 1010, one or more powering ports are provided each with an associated current limiter, such as current limiters 80 of FIG. 1 or current limiters 260 of FIG. 2.

In stage 1020 the current limiter of each port is set to one of the provided plurality of values of stage 1000. In the embodiment of FIG. 1, current limiter 80 is set to one of the values in first, second and third current limit value register 70 of control circuitry 40. In the embodiment of FIG. 2, current limiter 260 is connected to the output of one of first digital-to-analog converter 230 associated with first current limit value register 70 and second digital-to-analog converter 240 associated with second current limit value register 70.

In one embodiment, all of the ports of PoE controller 30 are set to a single initial value on a global assignment basis. In another embodiment, individual groups of ports are assigned to values. In yet another embodiment, each individual port is assigned a current limit. In stage 1030 detection functionality 50 of FIG. 1 or detection functionality 210 of FIG. 2 is operable to detect a connected valid powered device 110. In stage 1040 classification functionality 60 of FIG. 1 or classification functionality 220 of FIG. 2 is operable to determine the power requirements of the powered device 110 detected in stage 1030. In one embodiment, in the event the powered device 110 does not respond to a classification request, a default value is assigned to the power requirements of that device.

In optional stage 1050, in response to the classification of stage 1040 current limiter 80 of FIG. 1 or current limiter 260 of FIG. 2 is assigned to an appropriate value from the appropriate current limiter value register 70. Thus, the current limit of the port is adaptively changed responsive to the obtained classification value. In stage 1060, the powered device 110 detected in stage 1030 is powered. In an exemplary embodiment, powered device 110 is powered by closing electronically controlled switched 90 or by enabling FET 290.

Optionally, in stage 1070, host 120 receives data information transmitted from powered device 110 associated with power requirements thereof. Thus, in an Ethernet environment, data is transmitted via the Ethernet network from powered device 110 to host 120 indicative of power requirements. In response, host 120 transfers information regarding required power to control circuitry 40 of FIG. 1 or control circuitry 200 of FIG. 2. Control circuitry 40 of FIG. 1 or control circuitry 200 of FIG. 2 responsively sets the associated current limiter to an appropriate value thereby adjusting the current limit of the associated port.

Thus, the routine of FIG. 3 is operable to set the current limiter associated with the port to one of a plurality of operative values. In exemplary embodiment, the operative value is changed responsive to either a classification event or to a transmission over the data network via the host 120.

Figure 4:
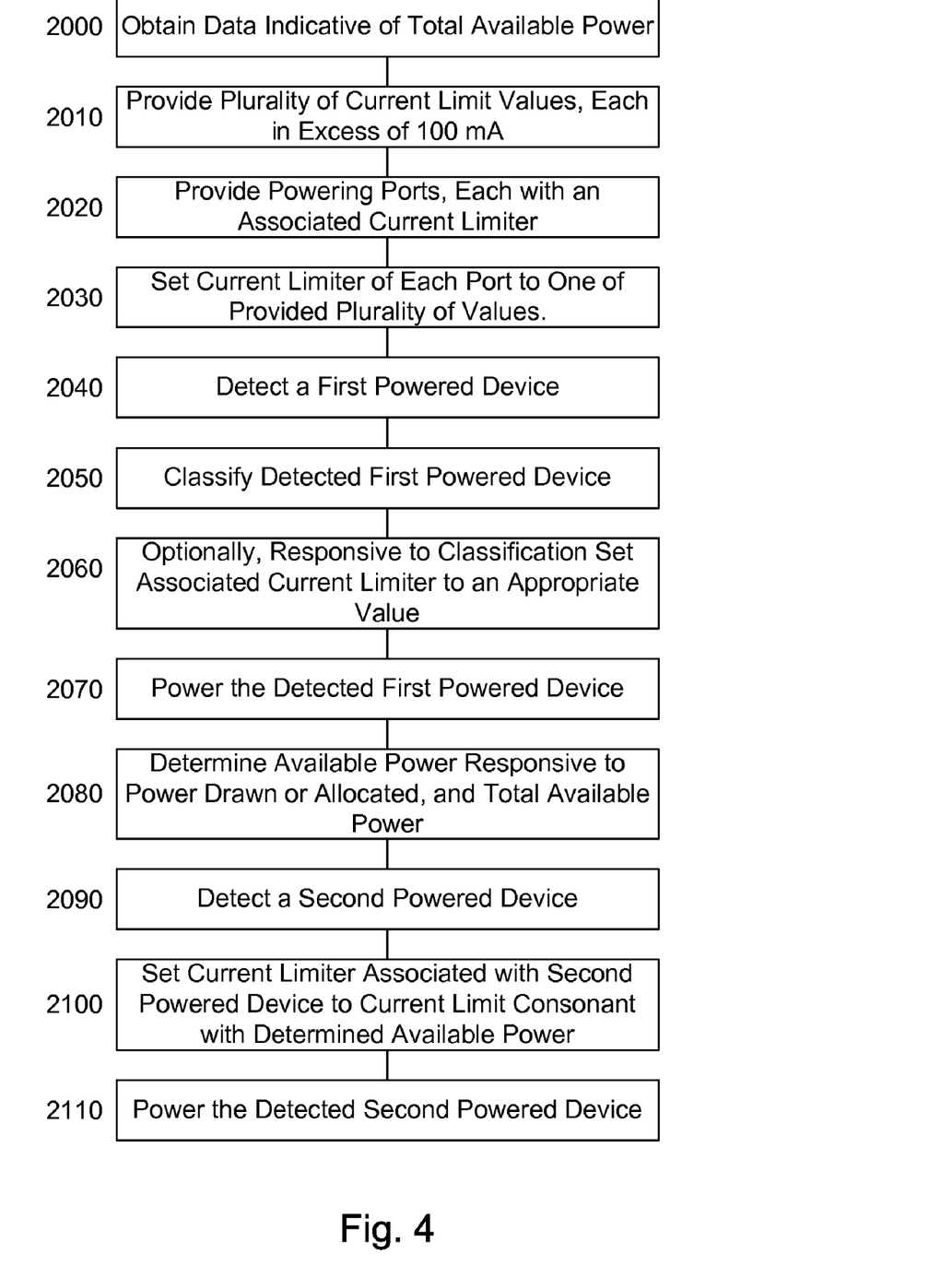
FIG. 4 illustrates a high level flow chart of an embodiment of the operation of the control circuitry of the PoE controller of FIGS. 1 or 2 to enable a reduced inrush current limit thereby improving overall power utilization, in accordance with the principle of the invention.

FIG. 4 illustrates a high level flow chart of an embodiment of the operation of control circuitry 40, 200 of PoE controller 30 of FIGS. 1 or 2 to enable a reduced inrush current limit thereby improving overall power utilization, in accordance with the principle of the invention. In stage 2000, data indicative of total available power is obtained. In one embodiment power availability from power source 20 of FIG. 1 is input by a user via host 120. In another embodiment, power source 20 supplies information regarding power availability to control circuitry 40.

In stage 2010, a plurality of current limit values each of which exceed 100 mA is provided. Values below 100 mA are typically not supplied for high power operation and are typically associated with automatic fallback positions to prevent overheating or internal damage to PoE controllers with internal FETs. In stage 2020, a plurality of powering ports are provided each with an associated current limiter, such as current limiters 80 of FIG. 1 or current limiters 260 of FIG. 2. In stage 2030 the current limiter of each port is set to one of a provided plurality of values. For example, current limiter 80 of FIG. 1 may be set to one of the values in either first second or third current limit register 70 of control circuitry 40. In the embodiment of FIG. 2, current limiter 260 is connected to the output of one of digital-to-analog converter 230 associated with first current limit value register 70 and digital-to-analog converter 240 associated with second current limit value register 70. In one embodiment, all of the ports of PoE controller 30 are set to a single initial value on a global assignment basis. In another embodiment, individual groups of ports are assigned to values. In yet another embodiment, each individual port is assigned a current limit.

In stage 2040, detection functionality 50 of FIG. 1 or detection functionality 210 of FIG. 2 is operable to detect a first connected valid powered device 110. In stage 2050, classification functionality 60 of FIG. 1 or classification functionality 220 of FIG. 2 is operable to determine the power requirements of the detected powered device 110 of stage 2040. In one embodiment, in the event the powered device does not respond to a classification request, a default value is assigned to the power requirements of that device. In optional stage 2060, in response to the classification of stage 2050 current limiter 80 of FIG. 1 or current limiter 260 of FIG. 2 is assigned an appropriate value. Thus, the current limit of the port is adaptively changed responsive to the obtained classification value. In stage 2070, the first powered device 110 detected in stage 2040 is powered. In an exemplary embodiment, powered device 110 is powered by closing associated electronically controlled switched 90 or by enabling FET 290.

In stage 2080, a current limit consonant with the available power after the operation of stage 2070 and responsive to the total available power obtained in stage 2000 is determined. In particular, in one embodiment the current limit determined is responsive to the actual power drawn by the powered device powered in stage 2070 and in another embodiment the current limit determined is responsive to the to the allocated or classified power of stage 2060. The total available power as obtained in stage 2000 is compared to one of the actual power drawn and the power allocated or classified, and the available power is thus determined as the difference thereof. In the event that the determined available power corresponds to a current in excess of the default current $I_{inrush}$, preferably the default $I_{inrush}$ value is utilized in stage 2100 below.

In stage 2090, detection functionality 50 of FIG. 1 or detection functionality 210 of FIG. 2 is operable to detect a second connected valid powered device 110. In stage, 2100 the current limiter associated with the second powered device of stage 2090 is set with the current limit determined in stage 2080. Optionally, classification as described above in relation to stage 2050 may be accomplished, and in the event that the power to be allocated responsive to the classification is greater than the amount determined in stage 2080, the detected power device 110 is not powered and the routine exits.

In stage 2110, the second powered device 110 detected in stage 2090 is powered. In an exemplary embodiment, powered device 110 is powered by closing electronically controlled switched 90 or by enabling FET 290. It is to be understood that in one embodiment the second powered device is powered with a current limit less than the default inrush current level, $I_{inrush}$. Such a reduced current level is typically sufficient to operate the device through to stabilization, where a current level lower than $I_{inrush}$ is experienced.

Thus, the present embodiments enable a PoE controller providing a plurality of selectable current limit values. Each port of the PoE controller may be assigned to any one of the plurality of current limit values and the assignment may be dynamically changed.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A power over Ethernet controller comprising:
    a control circuitry;
    at least one powering port, each of said at least one powering port comprising a unique means for controlling a switch associated therewith; and
    at least one current limiter, each of said at least one current limiter being associated with a unique one of said at least one powering port, each of said at least one current limiter arranged to limit the current through the controlled switch to a particular one of a settable plurality of values, each of said plurality values being in excess of 100 mA, said particular value being set responsive to said control circuitry.

2. A power over Ethernet controller according to claim 1, wherein said at least one powering port comprises a plurality of powering ports and said control circuitry is arranged to limit the current through each of the current limiters associated with said plurality of powering ports to a single one of said settable plurality of values.

3. A power over Ethernet controller according to claim 1, wherein said at least one powering port comprises a plurality of powering ports comprising a first group and a second group, and said control circuitry is arranged to set said current limiters associated with said first group to a first value, and to set said current limiters associated with said second group to a second value, said first value being different than said second value.

4. A power over Ethernet controller according to claim 1, wherein said particular value is responsive to classification of a powered device connected to said powering port.

5. A power over Ethernet controller according to claim 1, wherein each of said unique means for controlling a switch is responsive to said control circuitry, and wherein said control circuitry is arranged to:

detect a powered device connected to a particular one of said at least one powering port;

set the current limiter associated with said particular powering port to a first one of said plurality of values;

operate said unique means for controlling a switch associated with said particular powering port to power the detected powered device; and responsive to information transmitted by the detected powered device, set the current limiter associated with said particular powering port to a second one of said plurality of values.

6. A power over Ethernet controller according to claim 1, wherein each of said unique means for controlling a switch represents a unique output of said control circuitry.

7. A power over Ethernet controller according to claim 6, wherein each of said at least one powering port further comprises an electronically controlled switch responsive to said unique means for controlling a switch.

8. A power over Ethernet controller according to claim 1, wherein said control circuitry comprises a plurality of registers, each of said plurality of registers comprising a digital value associated with one of said plurality of values.

9. A power over Ethernet controller according to claim 8, further comprising a digital to analog converter arranged to convert one of said digital values in said plurality of registers to an analog value, each of said current limiters limiting said current to said settable particular value responsive to said analog value.

10. A power over Ethernet controller according to claim 8, further comprising:

a plurality of digital to analog converters, each of said plurality of digital to analog converters being associated with a particular one of said plurality of registers and arranged to convert said digital value to an analog value; and a multiplexer responsive to said control circuitry, said multiplexer in communication with the output of each of said plurality of digital to analog converters and responsive to an output of said control circuitry to connect one of said analog values to one of said plurality of current limiters thereby setting said current limiter to said particular value.

11. A power over Ethernet controller according to claim 1, wherein said control circuitry is arranged to:

obtain data indicative of the total available power;

detect a first powered device connected to a first one of said at least one powering port;

set the current limiter associated with said first powering port to a first one of said plurality of values;

operate said unique means for controlling a switch associated with said first powering port to power the detected first powered device;

determine an available power, said available power being responsive to said obtained data indicative of the total available power and one of the power being drawn by said powered device connected said first powering port and the power allocated to said powered device connected to said first powering port;

detect a second powered device connected to a second one of said at least one powering port;

set the current limiter of said second powering port to a value consonant with said determined available power; and operate said unique means for controlling a switch associated with said second powering port to power the detected second powered device.

12. A power over Ethernet controller according to claim 11, wherein said determined available power thereby prevents overload of said total available power.

13. A method of powering over communication cabling, the method comprising:

providing a plurality of current limit values, each of said provided current limit values being in excess of 100 mA;

providing at least one powering port, each of said provided at least one powering port having associated therewith a current limiter limiting the current flowing through said powering port to a settable one of said plurality of current limit values; and setting said associated current limiter of each of said provided at least one powering port to a particular one of said provided plurality of current limit values by a control circuitry.

14. A method according to claim 13, wherein said provided at least one powering port comprises a plurality of powering ports, and said setting of said associated current limiter of each of said provided plurality of powering ports is to a single one of said plurality of values.

15. A method according to claim 13, wherein said provided at least one powering port comprises a plurality of powering ports comprising a first group and a second group, and said setting of said current limiter associated with said first group is to a first value, and said setting of said current limiter associated with said second group is to a second value, said first value being different than said second value.

16. A method according to claim 13, further comprising:

detecting a powered device connected to a particular one of said provided at least one powering port; and classifying the detected powered device to determine a maximum current draw, wherein said setting of said current limiter associated with said particular one of said provided plurality of ports is responsive to said classifying.

17. A method according to claim 13, wherein said setting of said associated current limiter is to a first one of said plurality of values, the method further comprising:

detecting a powered device connected to a particular one of said provided at least one powering port;

powering the powered device;

receiving information transmitted by said powered device, said information being associated with powering requirements of the powered device; and setting said associated current limiter of said provided particular powering port to a second one of said provided plurality of current limit values responsive to said received information.

18. A method according to claim 13, further comprising storing each of said provided plurality of values is stored in a unique register.

19. A method according to claim 18, further comprising converting said stored value to an analog value.

20. A method according to claim 13, wherein said setting of said associated at least one current limiter is to a first one of said plurality of values, the method further comprising:

obtaining data indicative of the total available power;

detecting a first powered device connected to a first one of said provided at least one powering port;

powering the detected first powered device;

determining an available power, said available power being responsive to said obtained data indicative of the total available power and one of the power being drawn by said detected first powered device and the power allocated to said detected first powered device;

detecting a second powered device connected to a second one of said provided at least one powering port;

setting the current limiter associated with said second powering port to a limit consonant with said determined available power; and powering the detected second powered device.

21. A method according to claim 20, wherein said determined available value prevents overload of the total available power.

22. A power over Ethernet controller supporting a plurality of powering ports, the power over Ethernet controller comprising:

a control circuitry;

a plurality of powering ports, each of said plurality of powering ports comprising a switch responsive to said control circuitry; and a plurality of current limiters, each of said plurality of current limiters associated with a unique one of said powering ports, each of said plurality of current limiters arranged to limit the current through said switch to a settable one of a plurality of values, each of said values being in excess of 100 mA, said particular value being set responsive to said control circuitry.

23. A power over Ethernet controller comprising:

a control circuitry;

a powering port comprising a switch responsive to said control circuitry; and a current limiter arranged to limit the current through the switch to a settable one of a plurality of values, each of said values being in excess of 100 mA, said one of said plurality of values being set responsive to said control circuitry.

24. A power over Ethernet controller comprising:

a control circuitry;

a powering port comprising a means for controlling a switch associated therewith; and a current limiter arranged to limit the current through the controlled switch to a settable value responsive to said control circuitry, said control circuitry arranged to detect a powered device connected to said at least one powering port, classify the power requirements of the detected powered device and set the current limiter to a particular value responsive to said classified power requirements.

* * * * *

UNITED STATES PATENT AND TRADEMARK OFFICE
CERTIFICATE OF CORRECTION

PATENT NO. : 7,567,579 B2  Page 1 of 1
APPLICATION NO. : 11/552995
DATED : July 28, 2009
INVENTOR(S) : Dror Korcharz et al.

It is certified that error appears in the above-identified patent and that said Letters Patent is hereby corrected as shown below:

Col. 10, line 44, Claim 1 - should read - each of said plurality "of" values

Col. 11, line 57, Claim 11 - should read - said powered device connected "to" said first powering port Col. 12, line 52, Claim 18 - should read - storing each of said provided plurality of values in a unique register.

Col. 13, line 7 - 8, Claim 21 - should read - determined available "power" prevents overload Signed and Sealed this Fifth Day of January, 2010

David J. Kappos
*Director of the United States Patent and Trademark Office*